United States Patent
Chen

(10) Patent No.: US 12,445,039 B2
(45) Date of Patent: Oct. 14, 2025

(54) POWER-SAVING SUPPLY CONTROLLER CIRCUIT FOR SUPPLYING OF POWER BASED ON ELECTRICAL SPECIFICATION

(71) Applicant: ANPEC ELECTRONICS CORPORATION, Hsinchu (TW)

(72) Inventor: Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 266 days.

(21) Appl. No.: 18/381,217

(22) Filed: Oct. 18, 2023

(65) Prior Publication Data
US 2025/0070644 A1 Feb. 27, 2025

(30) Foreign Application Priority Data

Aug. 23, 2023 (TW) .................................. 112131582

(51) Int. Cl.
*H02M 1/088* (2006.01)
*G05F 1/56* (2006.01)
*G05F 1/565* (2006.01)

(52) U.S. Cl.
CPC ............... *H02M 1/088* (2013.01); *G05F 1/56* (2013.01); *G05F 1/565* (2013.01)

(58) Field of Classification Search
CPC ........... H02M 1/088; G05F 1/56; G05F 1/565
See application file for complete search history.

(56) References Cited

U.S. PATENT DOCUMENTS

| | | | |
|---|---|---|---|
| 10,601,329 B2* | 3/2020 | Chang | H02M 3/33523 |
| 2018/0337597 A1 | 11/2018 | Pazhayaveetil et al. | |
| 2019/0280587 A1* | 9/2019 | Li | H02M 1/32 |
| 2022/0209662 A1* | 6/2022 | Sun | H02M 1/0025 |

FOREIGN PATENT DOCUMENTS

CN 106786395 A 5/2017

* cited by examiner

*Primary Examiner* — Gary A Nash
(74) *Attorney, Agent, or Firm* — Li & Cai Intellectual Property (USA) Office

(57) ABSTRACT

A power-saving supply controller circuit of supplying power based on electrical specifications is provided. The power-saving supply controller circuit includes a first switch component, a second switch component and a control circuit. A first terminal of the first switch component and a first terminal of a capacitor are connected to a first terminal of a power supply device. Second terminals of the first and second switch components are connected to a second terminal of the power supply device. A first terminal of the second switch component is connected to a second terminal of the capacitor. When a current is supplied from the first terminal of the power supply device, the control circuit controls the first and second switch components such that a current flowing back to the second terminal of the power supply device is not smaller than a specified current.

18 Claims, 8 Drawing Sheets

POWER-SAVING SUPPLY CONTROLLER CIRCUIT FOR SUPPLYING OF POWER BASED ON ELECTRICAL SPECIFICATION

CROSS-REFERENCE TO RELATED PATENT APPLICATION

This application claims the benefit of priority to Taiwan Patent Application No. 112131582, filed on Aug. 23, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power supply controller circuit, and more particularly to a power-saving supply controller circuit for supplying of power based on electrical specifications.

BACKGROUND OF THE DISCLOSURE

With the development of science and technology, as functions are continuously added to electronic devices in recent years, power consumptions of these electronic devices are significantly increased. Therefore, amounts of power supplied by power converters and power supply efficiencies, i.e., the efficiency that power converters convert power from the power supply devices and supply the converted power to the electronic devices, must be improved.

When the power supply device supplies power to the power converter, a system detects a current flowing back to the power supply device and determines whether the current is larger than a current threshold and accordingly determines whether the power supply device is connected to the power converter. If a length of time during which the current flowing back to the power supply device is smaller than the current threshold exceeds a specified length of time, the system determines that the power converter is removed and instructs the power supply device to stop supplying a current. As a result, the power supply device does not continually supply power to the electronic device, which causes a reduction in an operating efficiency of the electronic device.

Therefore, when the current flowing back to the power supply device is smaller than the current threshold, the power supply device must supply more current to increase the current flowing back to the power supply device to be equal or larger than the current threshold prescribed by the electrical specifications within the specified time, such that the power supply device is instructed to continually supply power. However, a length of time required for the power supply device to supply more current often exceeds the specified time due to environmental factors, which causes additional power consumption.

SUMMARY OF THE DISCLOSURE

In response to the above-referenced technical inadequacies, the present disclosure provides a power-saving supply controller circuit for supplying power based on electrical specifications. The power-saving supply controller circuit includes a first switch component, a capacitor, a second switch component and a control circuit. A first terminal of the first switch component is connected to a first terminal of a power supply device. A second terminal of the first switch component is connected to a second terminal of the power supply device. A first terminal of the capacitor is connected to the first terminal of the power supply device and a first terminal of a load. A second terminal of the capacitor is connected to a second terminal of the load. A first terminal of the second switch component is connected to the second terminal of the capacitor. A second terminal of the second switch component is connected to the second terminal of the power supply device. The control circuit is connected to a control terminal of the first switch component and a control terminal of the second switch component. When a current is supplied from the first terminal of the power supply device, the control circuit controls operations of the first switch component and the second switch component, such that a sum of a current flowing through the first switch component to the second terminal of the power supply device and a current flowing through the capacitor, the load and the second switch component to the second terminal of the power supply device within specified time is not smaller than a current threshold prescribed by electrical specifications.

As described above, the present disclosure provides the power-saving supply controller circuit for supplying power based on the electrical specifications. After the power supply device supplies the current, the current flowing through the power-saving supply controller circuit of the present disclosure back to the power supply device is not smaller than the current threshold prescribed by the electrical specifications. Under this condition, the system does not determine that the power supply device is unconnected to the load and accordingly does not instruct the power supply device to stop supplying the current. Therefore, an efficiency that the load, such as the power converter, uses the current from the power supply device to supply power to an electronic device is improved. Furthermore, the on-time of the first switch component of the power-saving supply controller circuit of the present disclosure is reduced, thereby effectively reducing power consumption of the power supply device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
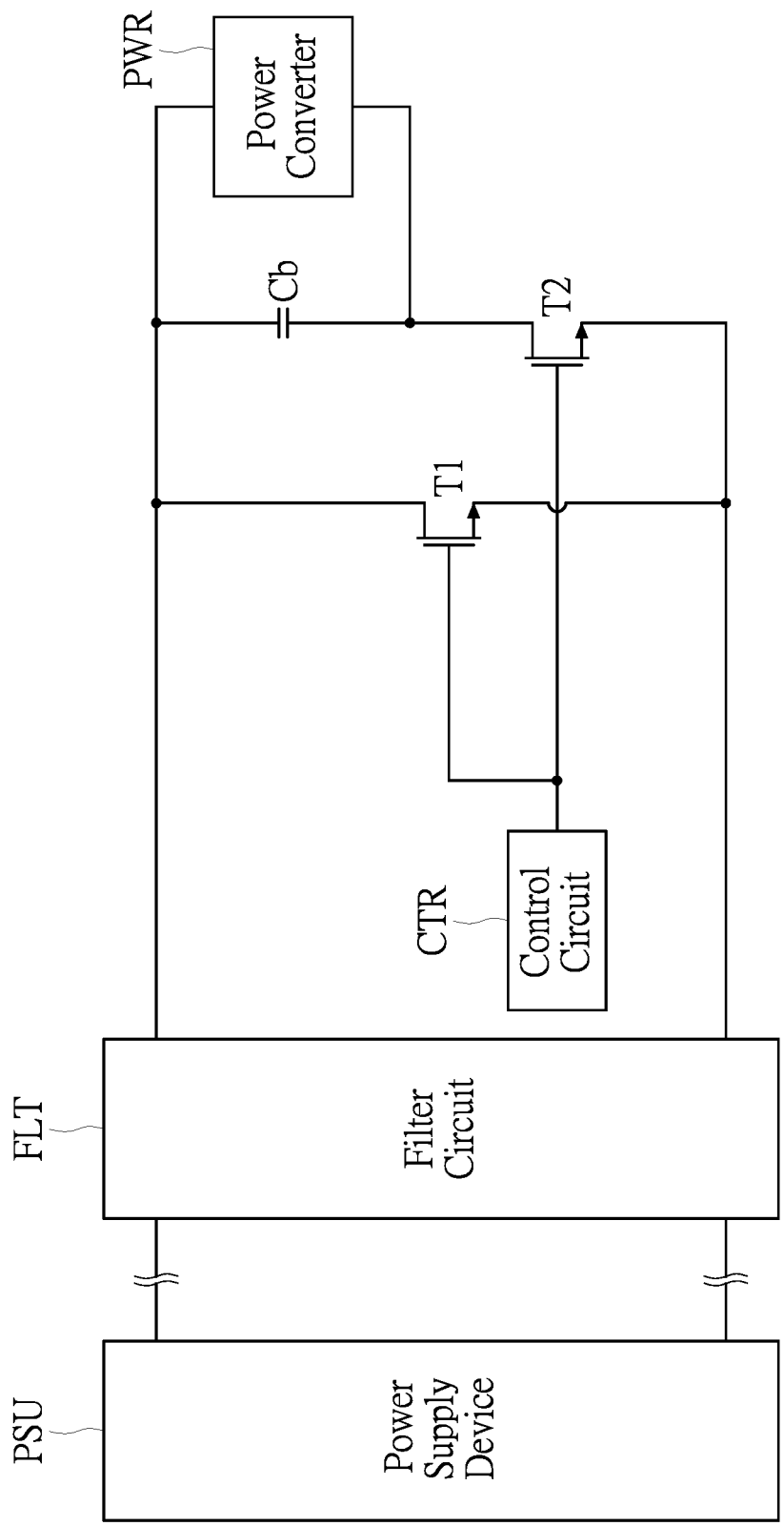
FIG. 1 is a circuit diagram of a power-saving supply controller circuit for supplying power based on electrical specifications according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 8:
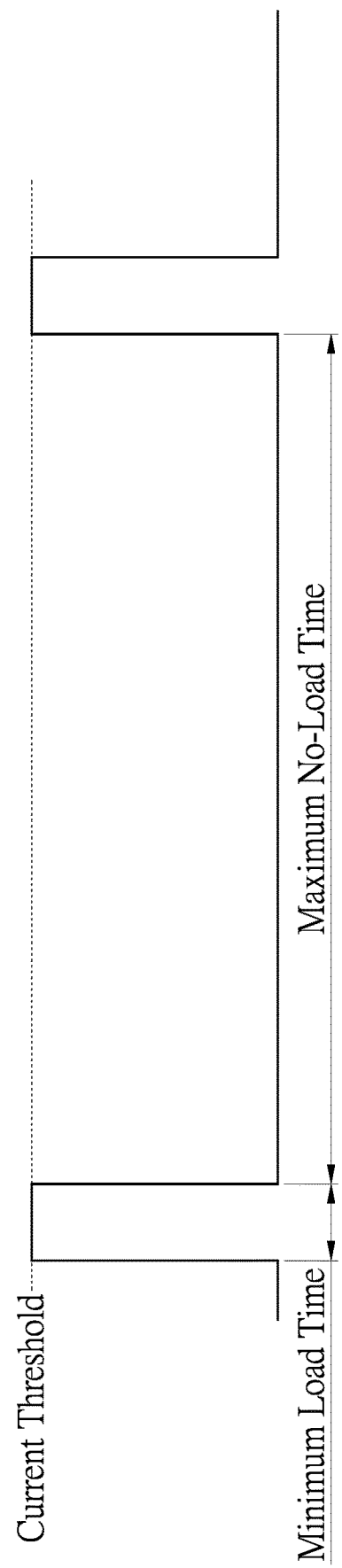
FIG. 8 is a schematic diagram of a connection state between the power-saving supply controller circuit of the first to third embodiments of the present disclosure and a load over time.

Reference is made to FIGS. 1 and 8, in which FIG. 1 is a circuit diagram of a power-saving supply controller circuit of supplying power based on electrical specifications according to a first embodiment of the present disclosure, and FIG. 8 is a schematic diagram of a connection state between the power-saving supply controller circuit of the first to third embodiments of the present disclosure and a load over time.

The power-saving supply controller circuit includes a first switch component T1, a second switch component T2, a capacitor Cb and a control circuit CTR as shown in FIG. 1. For example, as shown in FIG. 1, the first switch component T1 and the second switch component T2 may be the same type of transistors, but the present disclosure is not limited thereto. In practice, the first switch component T1 and the second switch component T2 that are included in the power-saving supply controller circuit of the present disclosure may be replaced with other transistors.

If necessary, in any of the embodiments of the present disclosure, the power-saving supply controller circuit may further include a filter circuit FLT. The filter circuit FLT is connected to a first terminal and a second terminal of a power supply device PSU, and is connected between the power-saving supply controller and the power supply device PSU.

A first terminal of the first switch component T1 is connected to the first terminal (that is the positive terminal) of the power supply device PSU (through the filter circuit FLT). A second terminal of the first switch component T1 is connected to the second terminal (that is the negative terminal) of the power supply device PSU (through the filter circuit FLT). The power supply device PSU may be a power supply, a voltage source or other devices that have power supplying functions.

A first terminal of the capacitor Cb is connected to the first terminal (that is the positive terminal) of the power supply device PSU (through the filter circuit FLT), and is connected to a first terminal of a load (such as, but not limited to a power converter PWR). The first terminal of the load (such as, but not limited to the power converter PWR) is connected to the first terminal (that is the positive terminal) of the power supply device PSU. A second terminal of the capacitor Cb is connected to the load (such as, but not limited to the power converter PWR).

A first terminal of the second switch component T2 is connected to the second terminal of the capacitor Cb. A second terminal of the second switch component T2 is connected to the second terminal (that is the negative terminal) of the power supply device PSU (through the filter circuit FLT).

The control circuit CTR is connected to a control terminal of the first switch component T1 and a control terminal of the second switch component T2.

It is worth noting that, when a current supplied from the first terminal (that is the positive terminal) of the power supply device PSU and the load that is a light load or is removed (within a minimum load time or a maximum no-load time as shown in FIG. 8), a current flowing back to the second terminal (that is the negative terminal) of the power supply device PSU may be smaller than a current threshold prescribed by the electrical specifications for a specified period of time (such as the minimum load time as shown in FIG. 8).

If the current flowing back to the second terminal (that is the negative terminal) of the power supply device PSU is smaller than the current threshold prescribed by the electrical specifications, a system determines that the power supply device PSU is not connected to the load (such as, but not limited to the power converter PWR) and accordingly instructs the power supply device PSU to stop supplying the current. As a result, the load (such as, but not limited to the power converter PWR) cannot obtain sufficient power.

Therefore, when the current is supplied from first terminal (that is the positive terminal) of the power supply device PSU, the control circuit CTR controls operations of the first switch component T1 and the second switch component T2 such that a sum of a current flowing through the first switch component T1 to the second terminal (that is the negative terminal) of the power supply device PSU and a current flowing through the capacitor Cb, the load (such as, but not limited to the power converter PWR) and the second switch component T2 to the second terminal (that is the negative terminal) of the power supply device PSU within specified time is not smaller than the current threshold prescribed by the electrical specifications.

That is, after the power supply device PSU supplies the current, the current that flows back to the power supply device PSU through the power-saving supply controller circuit of the present disclosure meets the electrical specifications. Under this condition, the power supply device PSU continually supplies power to the load (such as, but not limited to the power converter PWR). As a result, the load obtains sufficient power, and reduces extra power consumption in order to meet electrical specification.

For example, the control circuit CTR turns off the second switch component T2, turns on the first switch component T1 and controls the operations of the first switch component T1, such that the current flowing to the second terminal (that is the negative terminal) of the power supply device PSU through the first switch component T1 is equal to the current threshold, and the current flowing to the second terminal of the power supply device PSU through the second switch component T2 is equal to a zero value.

It is worth noting that, when the first switch component T1 is turned off and the current flowing through the second switch component T2 is smaller than the current threshold, the control circuit CTR switches the second switch component T2 from an on-state to an off-state and switches the first switch component T1 from the off-state to the on-state.

In other words, when the first switch component T1 is in the off-state and the second switch component T2 is smaller than the current threshold, the control circuit CTR decreases an on-time of the second switch component T2 and increases an on-time of the first switch component T1.

Figure 2:
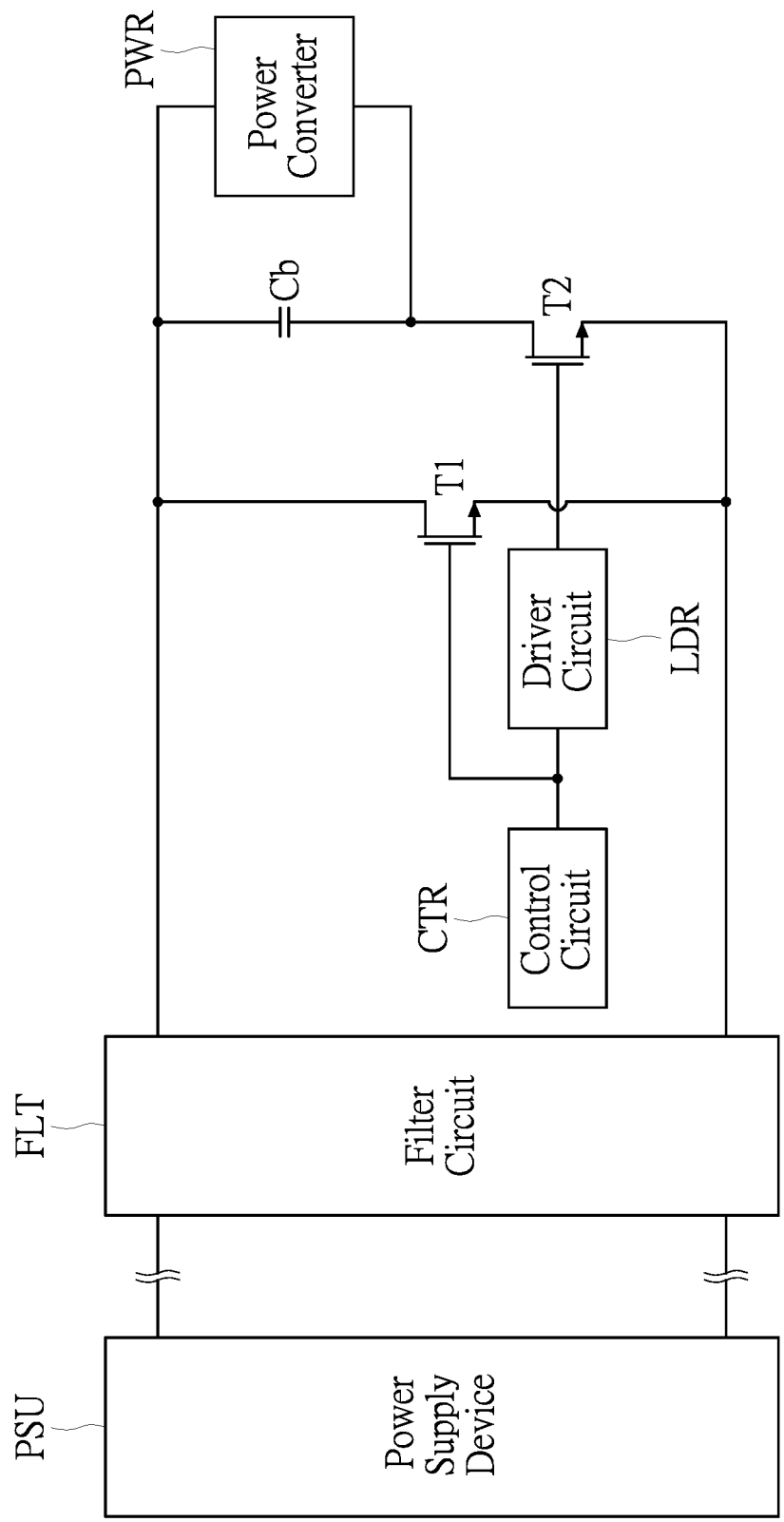
FIG. 2 is a circuit diagram of a power-saving supply controller circuit for supplying power based on electrical specifications according to a second embodiment of the present disclosure.

Reference is made to FIG. 2, which is a circuit diagram of a power-saving supply controller circuit of supplying power based on electrical specifications according to a second embodiment of the present disclosure. The contents of the second embodiment of the present disclosure that are the same as that of the first embodiment of the present disclosure are not repeated herein.

A difference between the second embodiment and the first embodiment of the present disclosure is that, as shown in FIG. 2, the power-saving supply controller circuit of the second embodiment of the present disclosure not only includes the first switch component T1, the second switch component T2, the capacitor Cb and the control circuit CTR, but also includes a driver circuit LDR. The driver circuit LDR may be connected between an output terminal of the control circuit CTR and the control terminal of the second switch component T2.

The driver circuit LDR may drive the second switch component T2 according to an on-time signal from the control circuit CTR.

For example, as shown in FIG. 1, the first switch component T1 and the second switch component T2 are n-type metal oxide semiconductor field effect transistors (MOSFET) and are turned on at the same voltage level, but the present disclosure is not limited thereto. In practice, the first switch component T1 and the second switch component T2 may be different types of transistors and may be turned on respectively at different voltage levels.

The control circuit CTR may output the on-time signal to the control terminal of the first switch component T1 and the driver circuit LDR. The first switch component T1 may operate according to the on-time signal from the control circuit CTR. When a current time reaches a working period of the on-time signal or the on-time signal is at a high level, the first switch component T1 is turned on. When the current time reaches a non-working period of the on-time signal or the on-time signal is at a low level, the first switch component T1 is turned off. At the same time, the driver circuit LDR may drive the second switch component T2 according to (a signal that is inverted from) the on-time signal outputted by the control circuit CTR. When the current time reaches the working period of the on-time signal or the on-time signal is at the high level, the second switch component T2 is turned off. When the current time reaches the non-working period of the on-time signal or the on-time signal is at the low level, the second switch component T2 is turned on.

Alternatively, the control circuit CTR may output the on-time signal to the control terminal of the first switch component T1 and output an off-time signal to the driver circuit LDR. The first switch component T1 may operate according to the on-time signal from the control circuit CTR. When the current time reaches the working period of the on-time signal or the on-time signal is at the high level, the first switch component T1 is turned on. When the current time reaches the non-working period of the on-time signal or the on-time signal is at the low level, the first switch component T1 is turned off. When the first switch component T1 operates according to the on-time signal from the control circuit CTR, the driver circuit LDR drives the second switch component T2 according to the off-time signal from the control circuit CTR. When the current time reaches the working period of the off-time signal (that is the same as the non-working period of the on-time signal) or the off-time signal is at the high level, the second switch component T2 is turned on. When the current time reaches the non-working period of the off-time signal (that is the same as the working period of the on-time signal) or the off-time signal is at the low level, the second switch component T2 is turned off.

Figure 3:
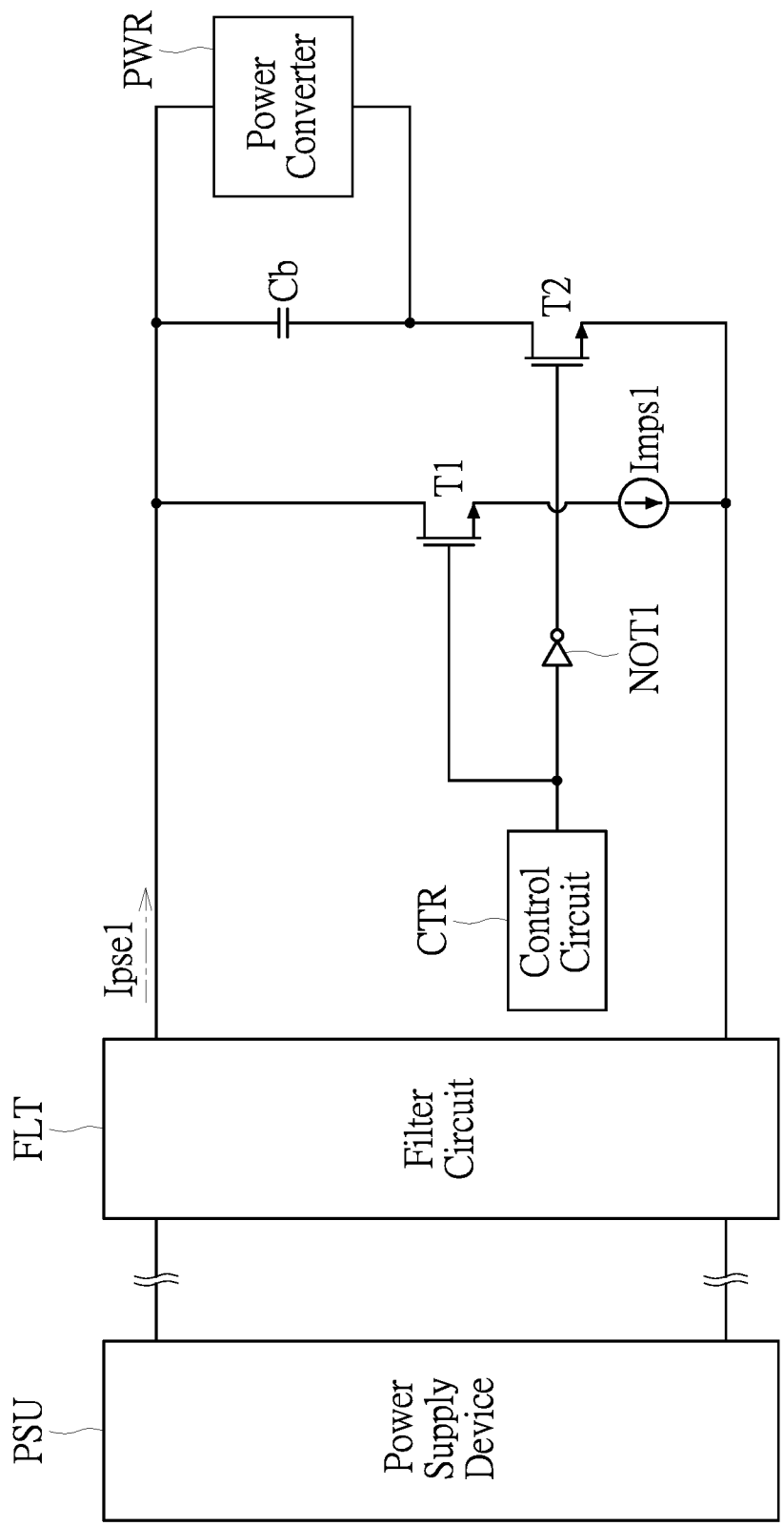
FIG. 3 is a circuit diagram of a power-saving supply controller circuit for supplying power based on electrical specifications according to a third embodiment of the present disclosure.

Reference is made to FIG. 3, which is a circuit diagram of a power-saving supply controller circuit of supplying power based on electrical specifications according to a third embodiment of the present disclosure. The contents of the third embodiment of the present disclosure that are the same as that of the second embodiment of the present disclosure are not repeated herein.

In the power-saving supply controller circuit of the third embodiment of the present disclosure, the driver circuit LDR may include an inverter NOT1. An input terminal of the inverter NOT1 is connected to the output terminal of the control circuit CTR. An output terminal of the inverter NOT1 is connected to the control terminal of the second switch component T2.

The inverter NOT1 is configured to invert a level of the on-time signal from the control circuit CTR and output the inverted on-time signal to the control terminal of the second switch component T2.

Figure 4:
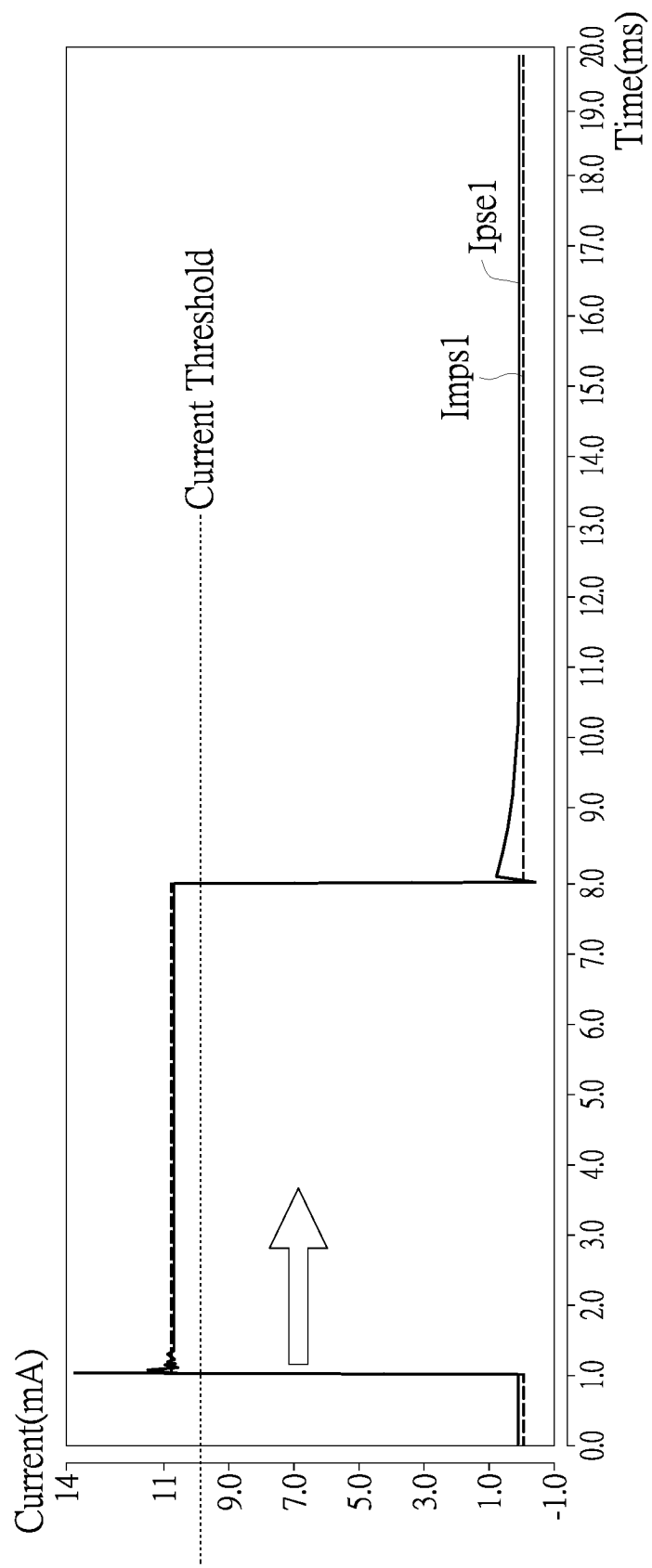
FIG. 4 is a waveform diagram of a current supplied by a power supply device and a current that flows back to the power supply device through the power-saving supply controller circuit according to the first to third embodiments of the present disclosure.
Figure 5:
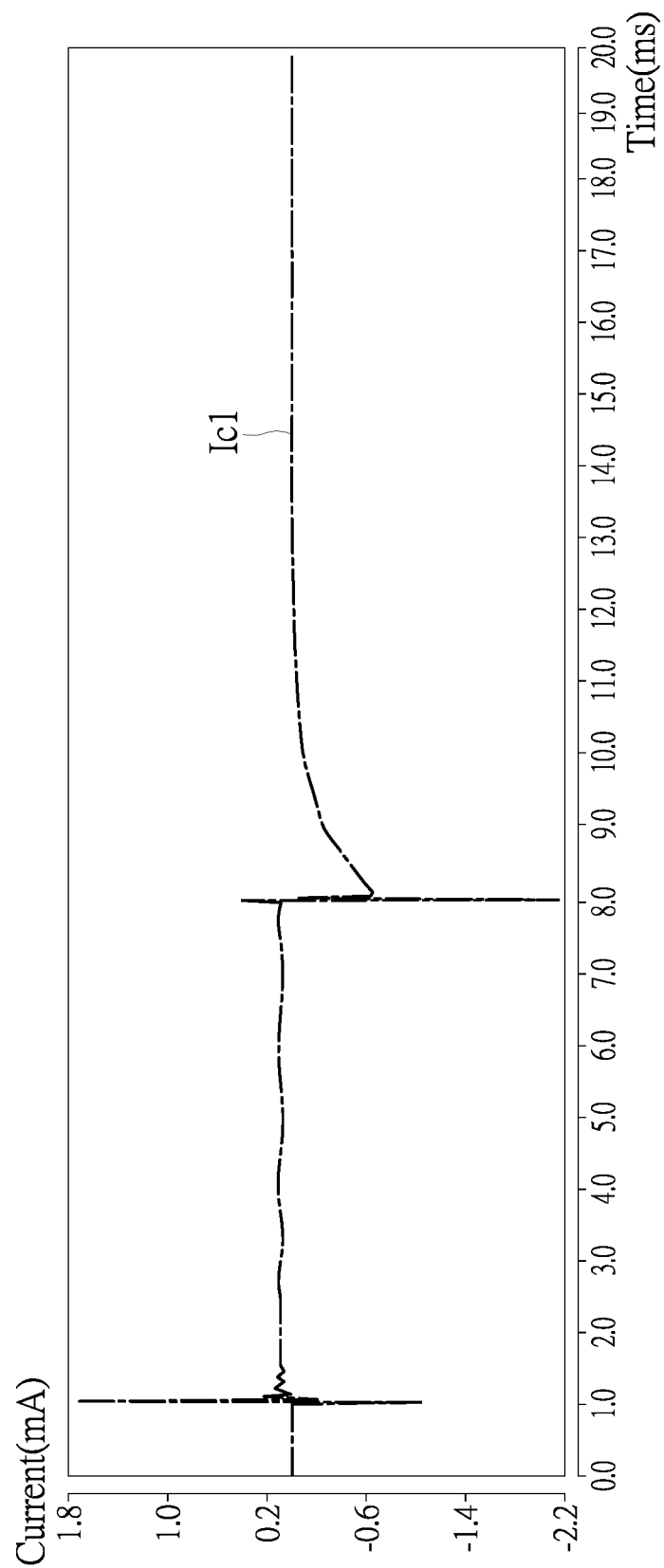
FIG. 5 is a waveform diagram of a current flowing through a capacitor in the power-saving supply controller circuit according to the first to third embodiments of the present disclosure.
Figure 6:
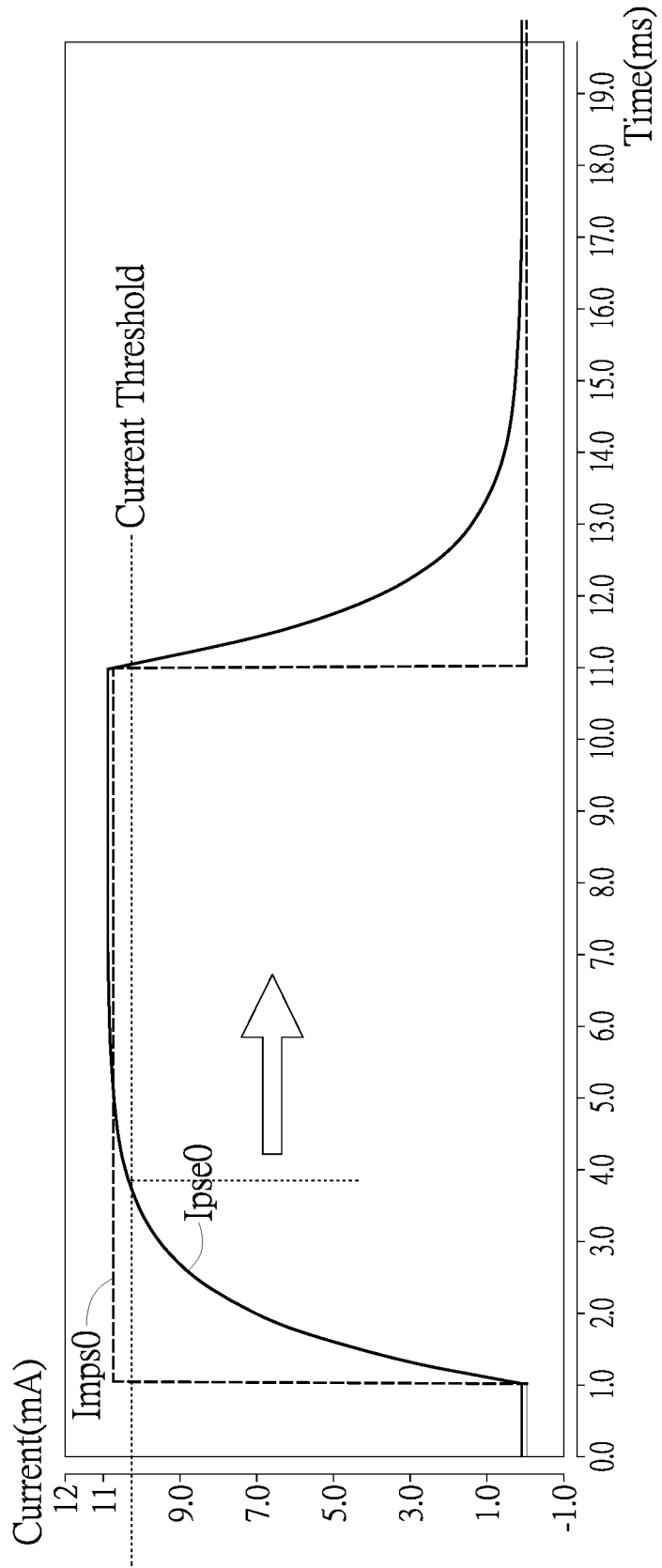
FIG. 6 is a waveform diagram of a current supplied by a power supply device and a current that flows back to the power supply device through a conventional power supply controller circuit.
Figure 7:
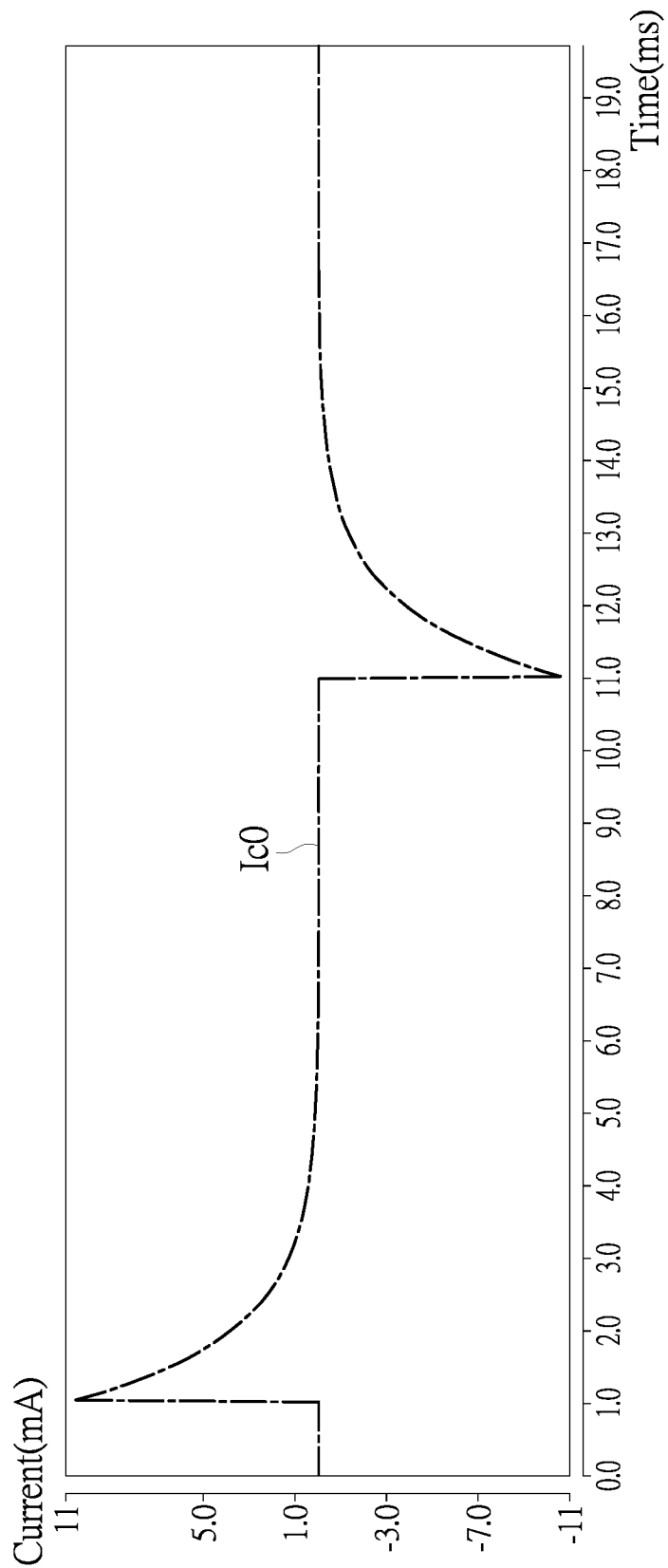
FIG. 7 is a circuit diagram of a current flowing through a capacitor in the conventional power supply controller circuit.

Reference is made to FIGS. 1 to 7, in which FIG. 4 is a circuit diagram of currents that are respectively supplied and received by the power-saving supply controller circuit applied to a power converter according to the first to third embodiments of the present disclosure, FIG. 5 is a waveform diagram of a current flowing through a capacitor in the power-saving supply controller circuit according to the first to third embodiments of the present disclosure, FIG. 6 is a waveform diagram of a current supplied by a power supply device and a current that flows back to the power supply device through a conventional power supply controller circuit, and FIG. 7 is a circuit diagram of a current flowing through a capacitor in the conventional power supply controller circuit.

The conventional power supply controller circuit continually turns on the second switch component T2 and turns off the first switch component T1 until when the current flowing through the second switch component T2 is smaller than the current threshold. The first switch component T1 is turned on for periods of time such that a current Imps0 flowing through the first switch component T1 back to the power supply device is not smaller than the current threshold prescribed by the electrical specifications. However, the power supply device may be disposed far away from other devices (including a control circuit and a power converter), or an electromagnetic filter is placed between the power supply device and the other devices, which causes a large inductance effect between the power supply device and the other devices. Under this condition, when the first switch component T1 has just been turned on, the current Imps0 flowing through the first switch component T1 is mainly provided by the capacitor Cb instead of the power supply device. As shown in FIGS. 6 and 7, when energy is balanced in the system, all the current flowing through the first switch component T1 is supplied by the power supply device such that the current Imps0 flowing through the first switch component T1 back to the power supply device is not smaller than the current threshold. However, time required for turning on the first switch component T1, such that the current Imps0 flowing through the first switch component T1 back to the power supply device is not smaller than the current threshold, exceeds time prescribed by the electrical specifications, which causes additional power consumption.

When the first switch component T1 is turned on and the second switch component T2 is turned off in the power-saving supply controller circuit of the present disclosure, a current Ipse1 flows from the first terminal (that is the positive terminal) of the power supply device PSU through the first switch component T1, but not the second switch component T2, to the second terminal (that is the negative terminal) of the power supply device PSU. At this time, as shown in FIG. 4, a current Imps1 flowing through the first switch component T1 to the second terminal (that is the negative terminal) of the power supply device PSU is approximately equal to the current Ipse1 supplied by the first terminal (that is the positive terminal) of the power supply device PSU. At the same time, as shown in FIG. 5, a current Ic1 flowing through the capacitor Cb is not increased. Therefore, the on-time of the first switch component T1 of the power-saving supply controller circuit of the present disclosure does not need to be increased. As a result, power consumption of the power supply device PSU is reduced significantly.

In conclusion, the present disclosure provides the power-saving supply controller circuit for supplying power based on the electrical specifications. After the power supply device supplies the current, the current flowing through the power-saving supply controller circuit of the present disclosure back to the power supply device is not smaller than the current threshold prescribed by the electrical specifications. Under this condition, the system does not determine that the power supply device is unconnected to the load and accordingly does not instruct the power supply device to stop supplying the current. Therefore, an efficiency that the load, such as the power converter, uses the current from the power supply device to supply power to an electronic device is improved. Furthermore, the on-time of the first switch component of the power-saving supply controller circuit of the present disclosure is reduced, thereby effectively reducing power consumption of the power supply device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power-saving supply controller circuit for supplying power based on electrical specifications, comprising:
    a first switch component, wherein a first terminal of the first switch component is connected to a first terminal of a power supply device, and a second terminal of the first switch component is connected to a second terminal of the power supply device;
    a capacitor, wherein a first terminal of the capacitor is connected to the first terminal of the power supply device and a first terminal of a load, and a second terminal of the capacitor is connected to a second terminal of the load;
    a second switch component, wherein a first terminal of the second switch component is connected to the second terminal of the capacitor, and a second terminal of the second switch component is connected to the second terminal of the power supply device; and
    a control circuit connected to a control terminal of the first switch component and a control terminal of the second switch component;
    wherein, when a current is supplied from the first terminal of the power supply device, the control circuit controls operations of the first switch component and the second switch component, such that a sum of a current flowing through the first switch component to the second terminal of the power supply device and a current flowing through the capacitor, the load and the second switch component to the second terminal of the power supply device within a specified time is not smaller than a current threshold prescribed by electrical specifications.

2. The power-saving supply controller circuit according to claim 1, wherein the load includes a power converter.

3. The power-saving supply controller circuit according to claim 1, wherein, when the control circuit turns off the second switch component, the control circuit turns on the first switch component.

4. The power-saving supply controller circuit according to claim 1, wherein, when the control circuit turns on the first switch component and turns off the second switch component, the control circuit controls the first switch component to operate such that the current flowing through the first switch component to the second terminal of the power supply device is equal to the current threshold, and the current flowing through the capacitor, the load and the second switch component to the second terminal of the power supply device is equal to a zero value.

5. The power-saving supply controller circuit according to claim 1, wherein the control circuit outputs an on-time signal to the control terminal of the first switch component and outputs an off-time signal to the control terminal of the second switch component, and a voltage level of the on-time signal is equal to a voltage level that is inverted from a voltage level of the off-time signal.

6. The power-saving supply controller circuit according to claim 1, wherein the control circuit outputs an on-time signal respectively to the control terminal of the first switch component and the control terminal of the second switch component,
- wherein, when a current time reaches a working period of the on-time signal or the on-time signal is at a high level, the first switch component is turned on and the second switch component is turned off;
- wherein, when the current time reaches a non-working period of the on-time signal or the on-time signal is at a low level, the first switch component is turned off and the second switch component is turned on.

7. The power-saving supply controller circuit according to claim 1, wherein, when the control circuit turns off the first switch component and the current flowing through the second switch component is smaller than the current threshold, the control circuit switches the second switch component from an on-state to an off-state and switches the first switch component from the off-state to the on-state.

8. The power-saving supply controller circuit according to claim 1, wherein, when the control circuit turns off the first switch component and the current flowing through the second switch component is smaller than the current threshold, the control circuit decreases time during which the second switch component is turned on and increases time during which the first switch component is turned on.

9. The power-saving supply controller circuit according to claim 1, further comprising:
- a driver circuit connected between an output terminal of the control circuit and the control terminal of the second switch component, and configured to drive the second switch component according to an on-time signal from the control circuit.

10. The power-saving supply controller circuit according to claim 9, wherein the driver circuit inverts a level of the on-time signal from the control circuit, and outputs the on-time signal having the level that is inverted to the control terminal of the second switch component.

11. The power-saving supply controller circuit according to claim 10, wherein the driver circuit includes:
- an inverter, wherein an input terminal of the inverter is connected to the output terminal of the control circuit, and an output terminal of the inverter is connected to the control terminal of the second switch component.

12. The power-saving supply controller circuit according to claim 9, wherein the driver circuit turns off the second switch component when a current time reaches a working period of the on-time signal or the on-time signal is at a high level, and the driver circuit turns on the second switch component when the current time reaches a non-working period of the on-time signal or the on-time signal is at a low level.

13. The power-saving supply controller circuit according to claim 12, wherein the first switch component operates according to the on-time signal from the control circuit, the first switch component is turned on when the current time reaches the working period of the on-time signal or the on-time signal is at the high level, and the first switch component is turned off when the current time reaches the non-working period of the on-time signal or the on-time signal is at a low level.

14. The power-saving supply controller circuit according to claim 1, wherein, when the load is removed from the power supply device or the load is a light load, the control circuit turns on the first switch component and turns off the second switch component, and the current flows from the first terminal of the power supply device through the first switch component to the second terminal of the power supply device.

15. The power-saving supply controller circuit according to claim 1, wherein the first switch component is a transistor.

16. The power-saving supply controller circuit according to claim 1, wherein the second switch component is a transistor.

17. The power-saving supply controller circuit according to claim 1, wherein the first terminal of the power supply device is a positive terminal.

18. The power-saving supply controller circuit according to claim 1, wherein the second terminal of the power supply device is a negative terminal.

* * * * *